(12) United States Patent
Keeler et al.

(10) Patent No.: US 10,006,213 B2
(45) Date of Patent: Jun. 26, 2018

(54) SWIMMING POOL SKIMMER ATTACHMENT

(71) Applicants: Christopher Andrew Keeler, Prospect, CT (US); Eric Wisnefsky, Southbury, CT (US)

(72) Inventors: Christopher Andrew Keeler, Prospect, CT (US); Eric Wisnefsky, Southbury, CT (US)

(*) Notice: Subject to any disclaimer, the term of this patent is extended or adjusted under 35 U.S.C. 154(b) by 0 days. days.

(21) Appl. No.: 15/336,072

(22) Filed: Oct. 27, 2016

(65) Prior Publication Data

US 2017/0121994 A1 May 4, 2017

Related U.S. Application Data

(60) Provisional application No. 62/248,023, filed on Oct. 29, 2015.

(51) Int. Cl.
| | |
|---|---|
| *E04H 4/12* | (2006.01) |
| *B01D 35/15* | (2006.01) |
| *C02F 1/00* | (2006.01) |
| *B01D 35/157* | (2006.01) |
| *C02F 103/42* | (2006.01) |

(52) U.S. Cl.
CPC ....... *E04H 4/1272* (2013.01); *B01D 35/1576* (2013.01); *C02F 1/001* (2013.01); *C02F 1/004* (2013.01); *C02F 2103/42* (2013.01)

(58) Field of Classification Search
CPC ... E04H 4/1272; B01D 35/1576; C02F 1/001; C02F 2103/42; C02F 1/004
USPC .............................. 210/167.1, 232, 767, 776
See application file for complete search history.

(56) References Cited

U.S. PATENT DOCUMENTS

| | | | |
|---|---|---|---|
| 3,268,079 A | 8/1966 | Sharrow | |
| 3,567,020 A * | 3/1971 | Whitaker | E04H 4/1272 210/121 |
| 6,041,453 A | 3/2000 | Barrow et al. | |
| 7,005,063 B2 | 2/2006 | Hodak | |
| 8,603,330 B1 | 12/2013 | Jones | |
| 2007/0045163 A1* | 3/2007 | Meincke | C02F 1/001 210/167.1 |
| 2011/0000838 A1* | 1/2011 | Lawson | E04H 4/0025 210/167.12 |
| 2014/0209546 A1* | 7/2014 | Smith | E04H 4/1272 210/776 |
| 2017/0175410 A1* | 6/2017 | Smith | E04H 4/1272 |

* cited by examiner

*Primary Examiner* — Fred Prince
(74) *Attorney, Agent, or Firm* — Dilworth IP, LLC

(57) ABSTRACT

A pool skimming system for removing debris from a pool water surface comprising a pool water skimmer; a stationary back plate removably connected to the pool water skimmer, the back plate comprising a front, a back, and an aperture; and a vertically mobile, buoyant front module comprising a rear slot disposed vertically, an aperture and a weir, the front module being slideably connected to the front of the back plate by connecting means at the vertical rear slot, wherein the front module moves up and down with the level of water in the pool to maintain a substantially constant position of the weir relative to the pool water surface.

11 Claims, 11 Drawing Sheets

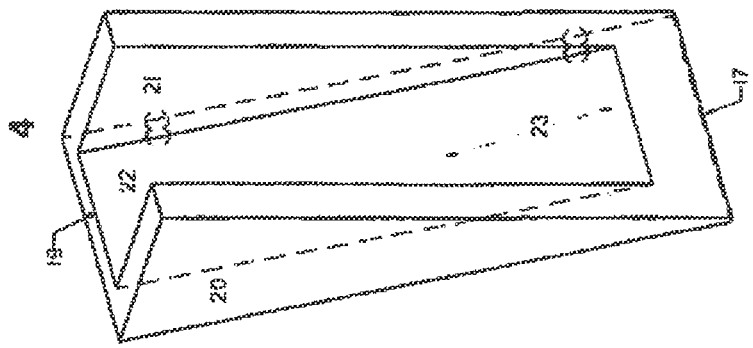
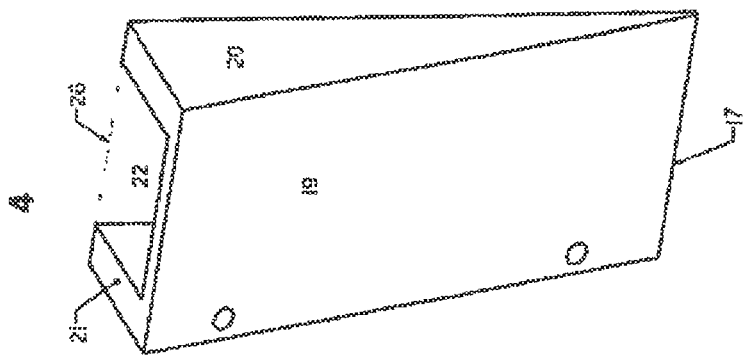
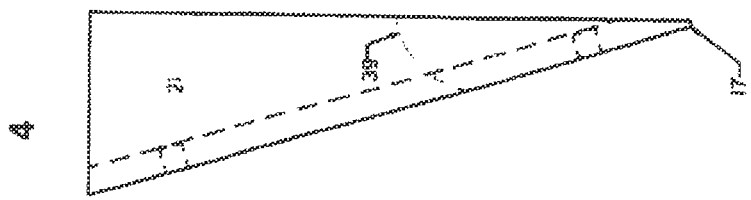
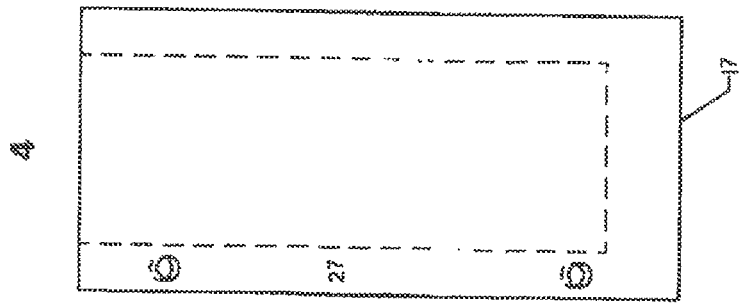
FIG 4

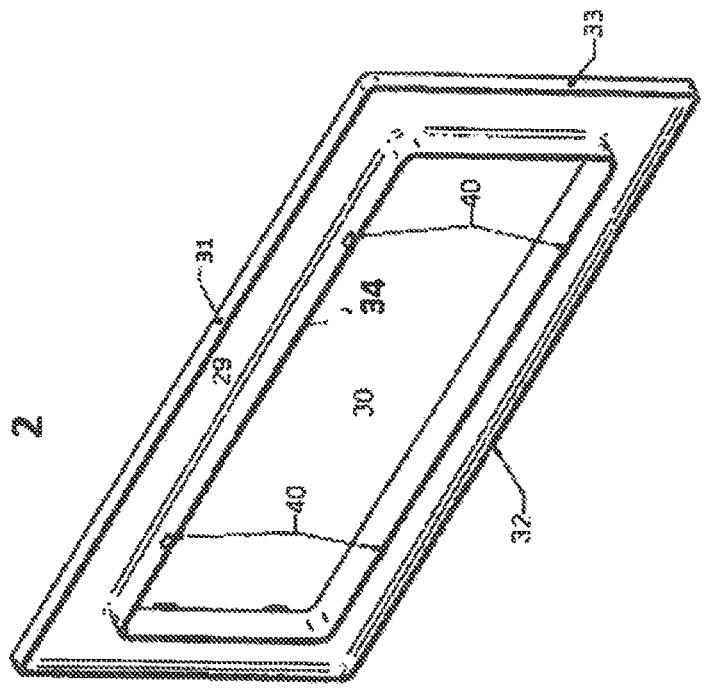
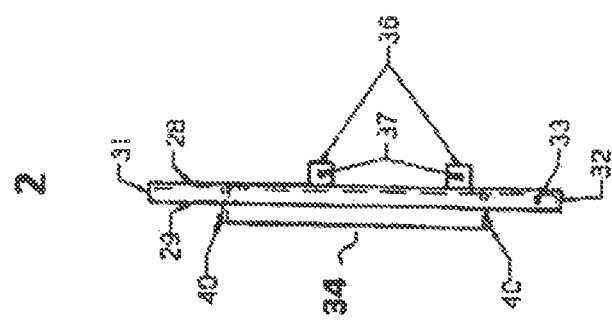
Fig. 11

SWIMMING POOL SKIMMER ATTACHMENT

FIELD OF THE INVENTION

The invention relates to an attachment for a swimming pool skimmer. More particularly, the invention relates to a swimming pool skimmer attachment that extends the effectiveness of the pool skimmer to increased pool water levels.

BACKGROUND OF THE INVENTION

Pools are used throughout the world as a popular source of enjoyment and exercise. However, as enjoyable as they are, pools require routine maintenance, such as the addition of chlorine, algaecides and pH control agents, to maintain the necessary pool water conditions. These chemicals are added to the pool, and then circulated by the pool's recirculation pumps through a filter, before returning it to the pool at a different location from which it was taken. The pool filters can remove solid particulates from the pool water that reach the filter. However, a challenge that remains for pool owners is debris that floats on the surface of the water, such as leaves, dead insects, cut grass, etc. While these materials can of course be manually removed by netting, it is desirable for them to be removed by the existing pool pump and filtration systems. Pool skimmers, i.e., generally rectangular openings in the sides of pools, are typically employed to continuously remove the surface debris by pulling it into the pool recirculation system where it can be processed by the filters. Optimally, the level of water is just high enough to provide the flow of pool water required by the pump design, while still maintaining a velocity of surface water sufficient to pull debris into the skimmer. However, the level of water in the pool significantly impacts the performance of the pool skimmer, since if the pool level is too low the pool recirculation system will be starved of water. If the water level is too high, although sufficient water can flow to the pool pump, the water obtained from the pool surface is lowered in favor of subsurface water. This reduces the velocity of water entering the pool at the pool surface, and thus the ability to pull surface debris into the pool pump system. As a result, pool owners must constantly deal with pool level changes due to evaporation or rainfall. Often an owner must remove water and add water in a short time span, which represents a waste of resources, and routes chemicals to the nation's waterways, or otherwise live with poor pool skimmer operation. Therefore, work has been ongoing to improve the efficiency of pool skimmers.

U.S. Pat. No. 3,268,079 discloses a water skimmer having a buoyancy control valve assembly for controlling the feed of surface water to a filter.

U.S. Pat. No. 6,041,453 discloses a floatable debris collector for gathering solid debris floating on the pool surface. The collector uses jets of water to wash recovered debris to a debris collector.

U.S. Pat. No. 7,005,063 discloses a flow diverting weir for attachment to the face plate of a pool skimmer having an enclosed scoop member with an opening on one side to allow entry of water from the pool into the skimmer.

U.S. Pat. No. 8,603,330 discloses a water diverter assembly positioned in a skimmer chamber between a well and a pool.

Nevertheless, a continuing need exists for pool skimming equipment and processes that allow an increase in the water height of the pool. This results in less drainage of water, which is environmentally and aesthetically desirable, makes pool maintenance simpler, and actually increases pool liner wear, since higher pool levels reduce the amount of liner exposed to UV radiation.

SUMMARY OF THE INVENTION

In one embodiment, the current invention relates to a pool skimmer attachment comprising a buoyant front module and a back plate. The front module comprises a face plate and two wedge-shaped side members. The face plate comprises a front, a back, an aperture to accommodate water flow, a top edge, a bottom edge and two side edges, the top edge being notched to form a weir comprising two angled side edges and a bottom edge, wherein the angled side edges are connected at one end to the top edge and at the other edge to the weir bottom edge. The wedge-shaped side members comprise a top, a bottom edge, a back wall, a front wall, an outer side wall, and an inner side wall, where the side member front wall, two side walls, and back wall form an interior channel disposed centrally along the side member's longitudinal axis; the back wall comprising a slot extending centrally along the longitudinal axis, wherein the slot has a width that is smaller than the width of the interior channel. The face plate is attached to each wedge-shaped side member along a substantially vertical overlapping section of the face plate back, proximate to the side edge and the front wall of the wedge-shaped side member proximate to the inner side wall, with the side member top being upwardly positioned. The back plate comprises a front, a back, an aperture to accommodate water flow, a top edge, a bottom edge and two side edges, and backwardly extending locking tabs for removably attaching the back plate to a pool skimmer opening. The front of the back plate comprises forwardly extending tabs that project through the side member back wall slots into the interior channel, wherein the forwardly extending tabs comprise a hole accommodating a pin positioned at an angle to the longitudinal axis of the slot, the pin having a length wider than the width of the slot, thereby slideably attaching the front module to the back plate, and permitting the free movement of the forwardly extending tabs within the slot, as the vertical position of the front module changes with the height of the water in the pool.

In another embodiment, the present disclosure provides a pool skimming system for removing debris from a pool water surface comprising a pool water skimmer; a stationary back plate removably connected to the pool water skimmer, the back plate comprising a front, a back, and an aperture; and a vertically mobile, buoyant front module comprising a rear slot disposed vertically, an aperture and a weir. The front module is slideably connected to the front of the back plate by connecting means at the vertical rear slot, wherein the front module moves up and down with the level of water in the pool to maintain a substantially constant position of the weir relative to the pool water surface.

In still another embodiment, the present disclosure provides a process for extending the effective performance of a pool skimmer to higher pool levels. The process comprises providing a pool skimming system in a pool having a level of water, the pool skimming system comprising a pool water skimmer and a pool skimmer attachment. The pool water skimmer comprises an aperture in the pool wall for receiving pool water, a conduit extending from the aperture to a water pump having an inlet end and a discharge end, a conduit extending from the pump discharge to a filter having an inlet and an outlet; and a conduit extending from the filter outlet to water ports in the pool wall. The pool skimmer attachment comprises a stationary back plate removably connected to the pool water skimmer aperture. The back plate comprises a front, a back, and an aperture. The vertically mobile, buoyant front module comprises a rear slot disposed vertically, an aperture and a weir, the front module being slideably connected to the front of the back plate by connecting means at the vertical rear slot, wherein the front module moves up and down with the level of water in the pool to maintain a substantially constant position of the weir relative to the pool water surface. Water from the pool is circulated over the front module weir, and through the aperture in the back plate into the pool skimmer aperture. The pool water is circulated from the pool skimmer aperture through the pool filter and back to the pool. The level of water in the pool is then increased, and the front module rises with the increasing level of water in the pool, thereby maintaining a constant level in the surface of the pool with respect to the weir.

BRIEF DESCRIPTION OF THE DRAWINGS

FIG. 4 is an illustration of multiple views of the front module side member.
FIG. 11 illustrates multiple views of the back plate.

DETAILED DESCRIPTION OF THE INVENTION

Figure 1:
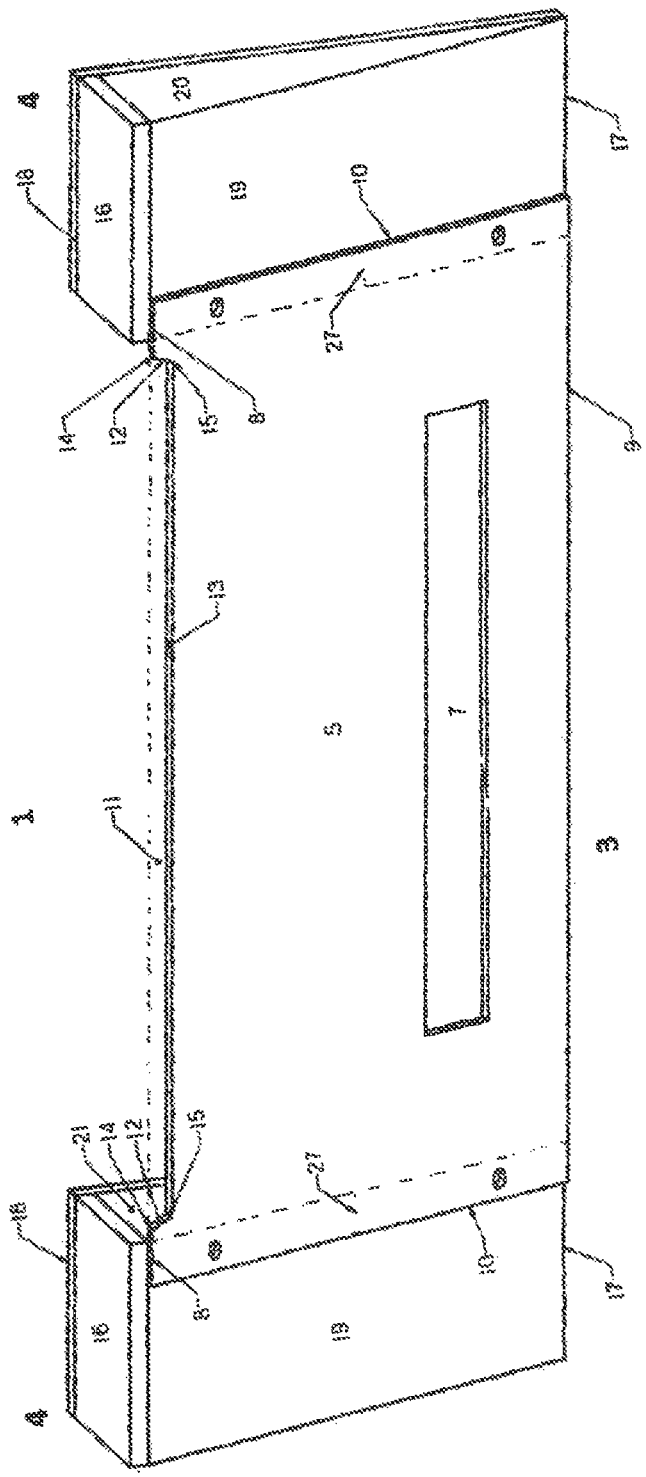
FIG. 1 is a front orthogonal view of the front module.

The present disclosure relates to a pool skimmer attachment, more particularly, a skimmer attachment that fits over an existing pool skimmer and facilitates a higher level of pool water to be maintained in the pool while still maintaining skimmer function. Typically, a skimmer will not function when the water level is above the top opening of the skimmer, requiring water to be drained from the swimming pool to reduce the water level to below the top of the skimmer opening. The pool skimmer attachment described in the present disclosure extends the range of efficiency for conventional pool skimmers to higher pool water levels. Conventional pool skimmers are generally rectangularly shaped apertures in the sidewall of a pool where water from the pool flows through the aperture. The flow of water into the skimmer aperture is induced by a pump located in the vicinity of the pool, where the pool water is pulled into the inlet/suction-side of the pump by the pump impeller. Typically, transport of pool water is facilitated by conduit such as piping or hoses. The pool water is discharged from the pump and routed to a filter for removing solid debris. Water exiting the filter is then returned to the pool at port locations configured to promote sufficient mixing for good cleaning.

The general surface water currents created by the pump filter return ports, and movement of water in the vicinity of the skimmer determines how much surface debris is pulled into the skimmer aperture. Pool water will of course only be pulled into the skimmer aperture if it resides above the bottom level of the skimmer, and this surface water accelerates toward the skimmer opening, carrying with it the associated surface debris. If the water level is too low, sufficient water cannot be pulled to the pool pump, causing air to enter the pump suction and resulting in pump cavitation. Such operation not only results in poor pump circulation, but ultimately damages the pump itself.

When the pool skimmer is operated at design levels, a certain volumetric rate of pool water ($ft^3$/min) is required by the pump. This rate is normally specified by the pool designer/manufacturer when the pool is first installed. Since the pool level above the skimmer bottom defines a cross-sectional area ($ft^2$) available for transport of the pool water, the surface water will enter the skimmer at the resulting pool water design velocity (ft/min). It is this velocity that pulls surface water into the skimmer. As the pool level rises above optimal levels due to rainfall or overfilling, the velocity of the water entering the skimmer aperture is reduced. This is because, although the overall volumetric demand of the pump is still approximately the same, the cross-sectional area of water available across the skimmer aperture is higher. If the pool level rises above the top of skimmer, then it cannot work at all, since all of the water pulled into the skimmer aperture is below the pool surface.

The present disclosure addresses this challenge by the design of a pool skimmer attachment that maintains the desired velocities into the skimmer aperture even at higher pool levels. Moreover, the pool skimmer attachment described in the present disclosure allows normal operation of the skimmer even when the pool level is above the top level of the skimmer. This is accomplished through the use of a weir that rises with the level of water in the pool. In one embodiment, the system contains a pool water skimmer; a stationary back plate and a front module. The pool water skimmer is a generally rectangular opening in the side of the pool for collection of pool water from the pool before it is routed to the pool pump and filters. One side of the stationary back plate is connected to the pool water skimmer in such a way that it can be easily removed, e.g., by backwardly extending ridges, locking tabs, snaps, or combinations thereof. The back plate has a front, a back, and an aperture. Water flows through the back plate aperture as it enters the pool skimmer. The back plate is also connected to a vertically mobile, buoyant front module. The front module contains a weir at its top edge over which pool water flows. The buoyancy of the front module allows its height to adjust as necessary to the changing level of water in the pool. This front module also contains an aperture for allowing the flow of water through the module without flowing over the weir. This front module aperture prevents pressure imbalance between the skimmer aperture and front module, which could result in too high a velocity over the weir, potentially entraining air into the water stream routed to the water pump and damaging the pump. The front module is slideably connected to the back plate by a connecting means that attaches the back plate to a vertical rear slot of the module. For the purposes of this specification, the expression "slideably connected" or "slideably attached" with respect to the connection between the back plate and slot on the rear of the front module means that the connection on the back plate is fixed, however, on the front module, the connection point can move vertically along the slot, while still securing the back plate to the front module. One example of such a connecting means is frontwardly extending tabs on the back face plate that extend into or through a vertically disposed slot on the back of the front module, or hollow blocks attached to the front module, and is secured in the slot or on the far side of the slot on the front module with a pin or other fastening means that allows the front module to be slideably attached. The slot can extend into the front module and be slideably attached there, or through the slot and be slideably attached there. As one skilled in the art would recognize, other designs could include a rail system residing in the slot. Because of its buoyancy, the front module can freely move up and down with the level of water in the pool, i.e., is vertically mobile, thereby maintaining a substantially constant position of the weir relative to the pool water surface where the pool water continues to flow over the weir, i.e., the weir is not submerged.

Normal operation of the pool skimmer attachment includes attaching the back plate to the pool skimmer aperture, e.g., via backwardly extending ridges, locking tabs, snaps, or combinations thereof, that fit into the skimmer aperture, holding it in place, but also allowing it to be easily removed. The back plate aperture is aligned so as to coincide with the positioning of the pool skimmer aperture as closely as possible.

The buoyant front module is slideably attached to the back plate via its rear slot, e.g., by a tab on the back plate that extends through the slot, which is fastened by a pin. Because the connection between the front of the back plate and the front module at the rear slot must be loose enough to allow the front module to move up and down with changing water levels, a reservoir is formed by the space between the front of the back plate and the rear of the front module.

The pool pump pulls water from the pool over the weir of the front module, discharging the pool water into the reservoir formed between the front of the back plate and the back of the front module. The pool water then flows through the apertures of the back plate and pool skimmer, to the pool pump and filters.

The pool skimmer front module is buoyant, so that the front module will float in water unless otherwise constrained not to do so. This not only facilitates the ability of the front module weir to remain at a particular position relative to the pool surface, but makes it easily retrievable if it is inadvertently dropped in the pool.

Preferably, the front module is constructed of a buoyant material. More preferably, the buoyant material is selected from polyolefins having a density less than 1.0. Such polyolefins can include polyethylene, polypropylene or polybutene. When the polymer is polyethylene, it preferably includes ethylene homopolymers and copolymers or terpolymers of ethylene with $C_{3-10}$ alpha-olefins. More preferably, the polyethylene is low density polyethylene (LDPE) having a density of 0.910 to 0.940 g/cm$^3$. When the polymer is polypropylene, it preferably includes propylene homopolymers, copolymers of propylene with ethylene or $C_{4-10}$ alpha-olefins, and terpolymers of propylene with $C_{4-8}$ olefins. When the polymer is polybutene, it preferably includes butene-1 homopolymers and butene-1 copolymers or terpolymers with $C_{2-3}$ or $C_{5-8}$ alpha-olefins. More preferably, the front module is produced with LDPE.

The front module and the back plate may be constructed from pieces that are fixed together, e.g., with the use of appropriate adhesives, screws, or other fasteners, or the front module and back plate can be produced by molding. Preferably, the front module and back plate are molded pieces produced by injection molding, blow molding, compression molding, gas assist molding, rotational molding or thermoforming. More preferably, the materials are produced by injection molding. Any or all of pieces can be molded pieces. Preferably the entire front module is produced by molding.

In another embodiment, the present disclosure relates to a pool skimmer attachment comprising a buoyant front module and a back plate. The front module comprises a face plate and two wedge-shaped side members. The face plate comprises a front, a back, an aperture to accommodate water flow, a top edge, a bottom edge and two side edges. The top edge is notched to form a weir comprising two angled side edges and a bottom edge. For the purposes of this application, the term "angled side edges" means an angle greater than 90 degrees, since it has been found that angles of 90 degrees or less are vulnerable to debris becoming fixed in the corner of the weir. Preferably, the angle of the angle sided edges is from 95 to 135 degrees. These angled side edges are connected at one end to the top edge of the face plate and at the other edge to the weir bottom edge.

The aperture of the front plate allows the flow of water through the front plate to prevent pressure imbalance, as described above. The aperture of the front plate can be a single opening or a plurality of openings. Preferably, the aperture is a generally rectangular opening. Preferably, the aperture, whether a single opening or a plurality of openings is positioned horizontally. Optionally, an adjustable flapper is installed on the face plate for regulating water flow through the face plate aperture.

The wedge-shaped side members comprise a top, a bottom edge, a back wall, a front wall, an outer side wall, and an inner side wall. The wedge-shaped side members in the front module form a reservoir between the inner side walls, the rear of the face plate, and the front of the back plate. This reservoir facilitates a more even pool skimmer operation since it dampens the oscillation of water level in front of the back plate and the skimmer aperture, which in turn provides a more even, continuous flow of water to the pool pump.

The side member front wall, two side walls, and back wall form an interior channel disposed centrally along the side member's longitudinal axis. The back wall comprises a slot that extends centrally along the longitudinal axis, and has a width that is smaller than the width of the inner channel to permit insertion of the forwardly extending tabs into the interior channel. The face plate is attached to each wedge-shaped side member along a substantially vertical overlapping section of the face plate back proximate to the side edge, and the front wall of the wedge-shaped side members proximate to the inner side wall, where the side member top is upwardly positioned. Thus, the side edges of the face plate are arranged parallel to the side member side walls and the width of the overlapping section should be constant along its length, where the overlapping section is a portion of the face plate that fits over the side member front wall between the face plate side edge and the side member inner side wall. The face plate and wedge-shaped side member are attached with an adhesive or fasteners such as a plurality of screws or bolts. One skilled in the art would understand that if the front module is produced by injection molding, the side members are not attached to the face plate by adhesives or screws, but instead are continuous pieces.

The wedge-shaped side member is positioned so that the side member top is proximate to the face plate top edge, and the bottom edge of the side member is proximate to the face plate bottom. Thus, the side member top is above the pool water level and the bottom edge is below. Preferably, the angle of wedge-shaped side member defined by the intersection of the outer edges of the side walls at the bottom edge is from 5 to 40 degrees, more preferably 10 to 25 degrees. In this way, the horizontal distance between the pool side wall and the weir is controlled within a certain range to ensure that the weir does not project too far into the pool, for safety and aesthetic reasons.

The back plate comprises a front, a back, an aperture to accommodate water flow, a top edge, a bottom edge and two side edges, and backwardly extending locking tabs for removably attaching the back plate to a pool skimmer aperture. For the purposes of this specification, the term "removably attaching" or "removably attached," with respect to attaching the back plate to the pool skimmer aperture, means the back plate is held in position over the pool skimmer aperture in normal operation, while still allowing it to be easily removed, e.g., for cleaning. The back of the back plate faces the pool side wall, and the aperture of the back plate is aligned with the pool skimmer aperture as closely as possible to maximize the free flow of pool water.

The front of the back plate comprises forwardly extending tabs that project through the side member back wall slots into the interior channel. The forwardly extending tabs comprise a hole for the insertion of a pin positioned at an angle to the longitudinal axis of the slot within the interior channel sufficient to secure the forwardly extending tabs in the slot. The pin has a length wider than the width of the slot, so that the front module is slideably attached to the back plate, as described above. The pin can slide up and down the interior channel as the front module rises and falls with an increase or decrease in the pool surface. In such a way, the attachment with pins permits the free movement of the forwardly extending tabs within the slot, as the vertical position of the front module changes with the height of the water in the pool, while maintaining a connection between the front module and the back plate.

In still another embodiment, the subject matter of the present disclosure provides a process for extending the effective performance of a pool skimmer to higher pool water levels. As discussed above, a process allowing efficient operation of the pool skimmer at high water levels of the pool skimmer has great benefits in reducing the need to wastefully drain water to the sewer, where the chlorine and other chemicals would eventually find their way to the nation's waterways. Moreover, the practice is wasteful of water resources. In particular, being able to operate at higher water levels after rainfall will reduce the number of times it is needed to add water during periods when there is no rainfall. This benefits over-taxed water storage reservoirs during hot, dry weather, as well as increasing pool liner wear, since higher pool levels reduce the amount of liner exposed to UV radiation. The process comprises providing a pool skimming system in a pool having a level of water. The skimming system comprises a pool water skimmer and a pool skimmer attachment. The pool water skimmer comprises an aperture for collecting water from the pool, and a pool cleaning system comprising a water pump and a filter. The pump has a feed end and a discharge end. Conduit, such as piping or hosing, extends from the aperture to the pump inlet and from the pump discharge to a filter having an inlet and an outlet. Conduit also extends from the filter outlet to water inlet ports in the pool wall. In this way, water flows through the pool skimmer aperture, from the aperture to the pump, from the pump to the filter, and then from the filter back to the pool. The pool skimmer attachment comprises a stationary back plate removably connected to the pool water skimmer aperture. The back plate comprises a front, a back, and an aperture. The buoyant front module is vertically mobile, and comprises a rear slot disposed vertically, an aperture and a weir. The front module is slideably connected to the front of the back plate by connecting means at the vertical rear slot, and moves up and down with the level of water in the pool to maintain a substantially constant position of the weir relative to the pool water surface. Water from the pool is circulated over the front module weir, and through the aperture in the back plate into the pool skimmer aperture. Water from the pool skimmer aperture is circulated through the pool cleaning system and back to the pool. Finally, the level of water in the pool is increased, e.g., due to rain or overfill, and the front module rises with the increasing level of water in the pool, thereby maintaining a constant level in the surface of the pool with respect to the weir.

Referring now to FIG. 1, front module 1 is composed of two wedge-shaped side members 4 and face plate 3. Side members 4 are oriented with the wide section of the wedge corresponding to the side member top 16 at the top and the side member bottom edge 17 at the bottom. The side members 4 have a front wall 19, back wall 18, outer side wall 20 and inner side wall 21. Inner side walls 21 face each other. Face plate 3 has a front face 5, aperture 7, a top edge 8, side edges 10 and bottom edge 9. Weir 11 is formed by notching top edge 8 to produce angled side edges 12 and weir bottom 13. The angled side edges 12 begin at the top edge 8 end point 14 and end at the weir bottom 13 end point 15. Face plate 3 is attached to side members 4 by an adhesive or a plurality of screws along overlapping sections 27 of the side member front walls 19 and face place 3. Overlapping sections 27 extend along the face plate side edge 10 from the face plate top edge 8 to the face plate bottom edge 9.

Figure 2:
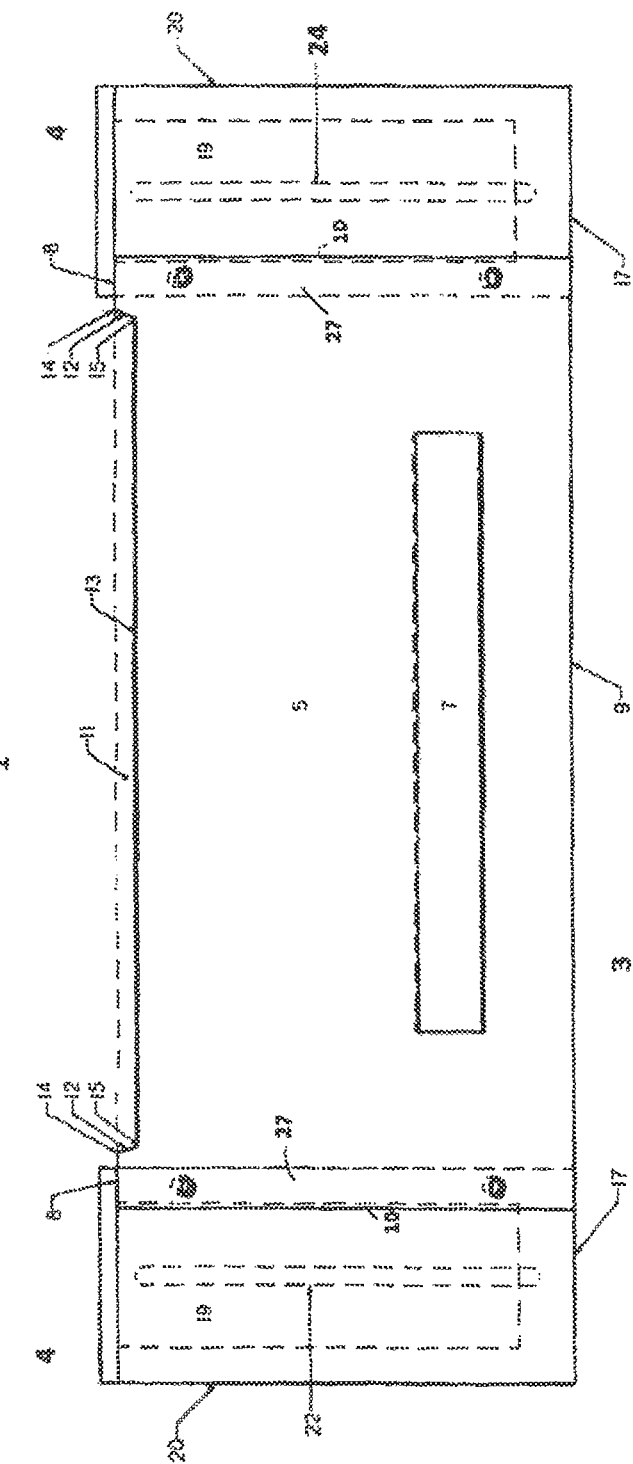
FIG. 2 is a front view of the front module.

Referring now to FIG. 2, front module 1 is composed of two wedge-shaped side members 4 and face plate 3. The side members 4 have a front wall 19, outer side wall 20. Face plate 3 has a front face 5, aperture 7, a top edge 8, side edges 10 and bottom edge 9. Weir 11 is formed by notching top edge 8 to produce angled side edges 12 and weir bottom 13. The angled side edges 12 begin at the top edge 8 end point 14 and end at the weir bottom 13 end point 15. Face plate 3 is attached to side members 4 by an adhesive or a plurality of screws along overlapping sections 27 of the side member front walls 19 and face plate 3. Overlapping sections 27 extend along the face plate side edge 10 from the face plate top edge 8 to the face plate bottom edge 9.

Figure 3:
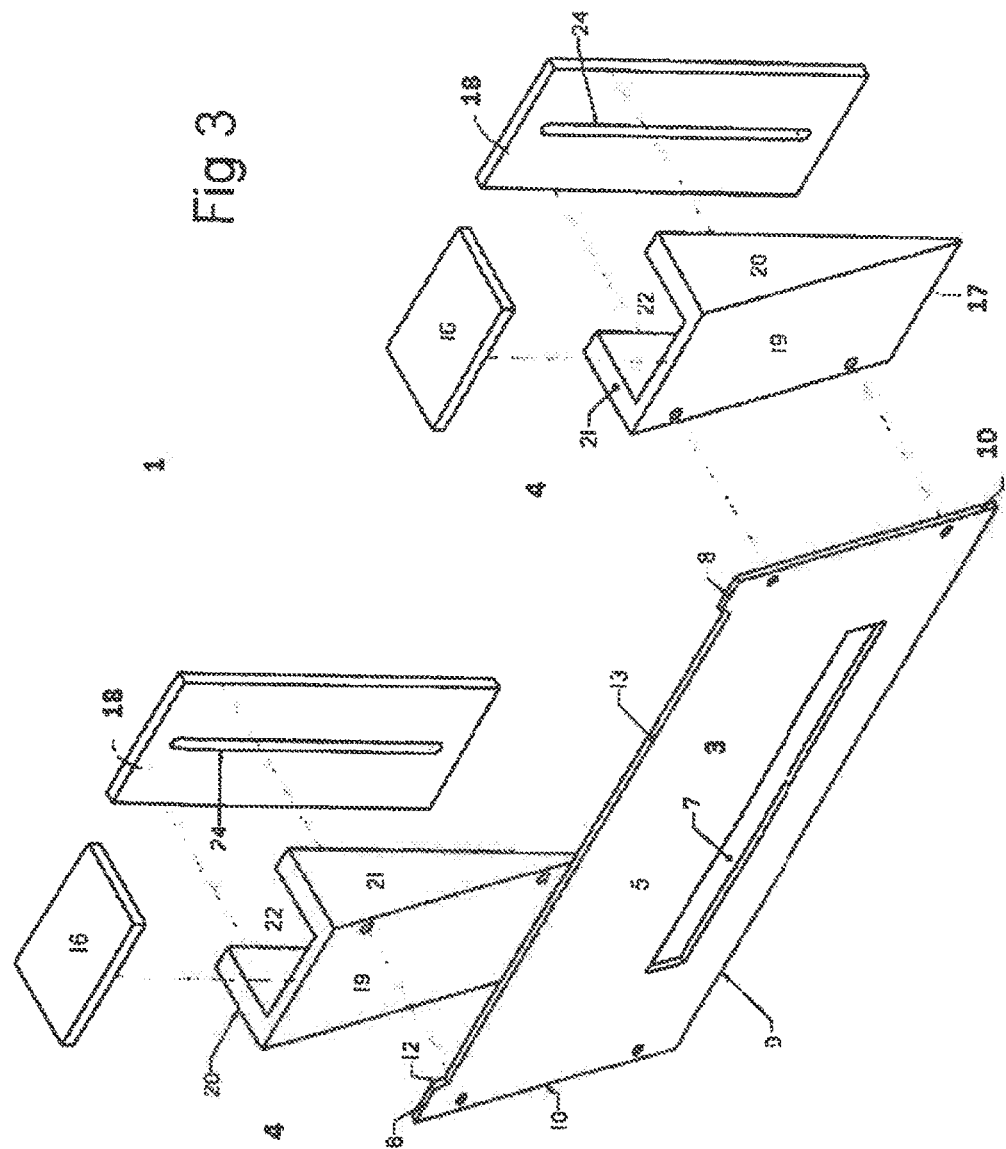
FIG. 3 is an assembly view of the front module.

Referring to FIG. 3, front module 1 is composed of two wedge-shaped side members 4 and face plate 3. Side members 4 are oriented with the wide section of the wedge corresponding to the side member top 16 at the top and the side member bottom edge 17 at the bottom. The side members 4 have a front wall 19, back wall 18, outer side wall 20 and inner side wall 21. Inner side walls 21 face each other. Face plate 3 has a front face 5, aperture 7, a top edge 8, side edges 10 and bottom edge 9. Side member interior channel 22 is formed by front wall 19, side walls 20 and 21 and back wall 18. Back wall 18 contains a slot 24 that is positioned vertically. Slot 24 allows a connection with the black plate 2 such that the front module 1 can move vertically to accommodate changing water heights in the pool.

Referring to FIG. 4, side members 4 have a front wall 19, outer side wall 20, inner side wall 21, and bottom edge 17. Overlapping section 27 extends along the face plate side edge 10. Side member interior channel 22 is formed in the space between front wall 19, outer side wall 20 and inner side wall 21, disposed vertically along the longitudinal axis 23 of side member 4. Interior channel 22 has width 26. An angle 39 of wedge-shaped side member 4 is defined by the intersection of the outer edges of side wall 20 or 21 at bottom edge 17, preferably ranges from 5 to 40 degrees, more preferably 10 to 25 degrees.

Figure 5:
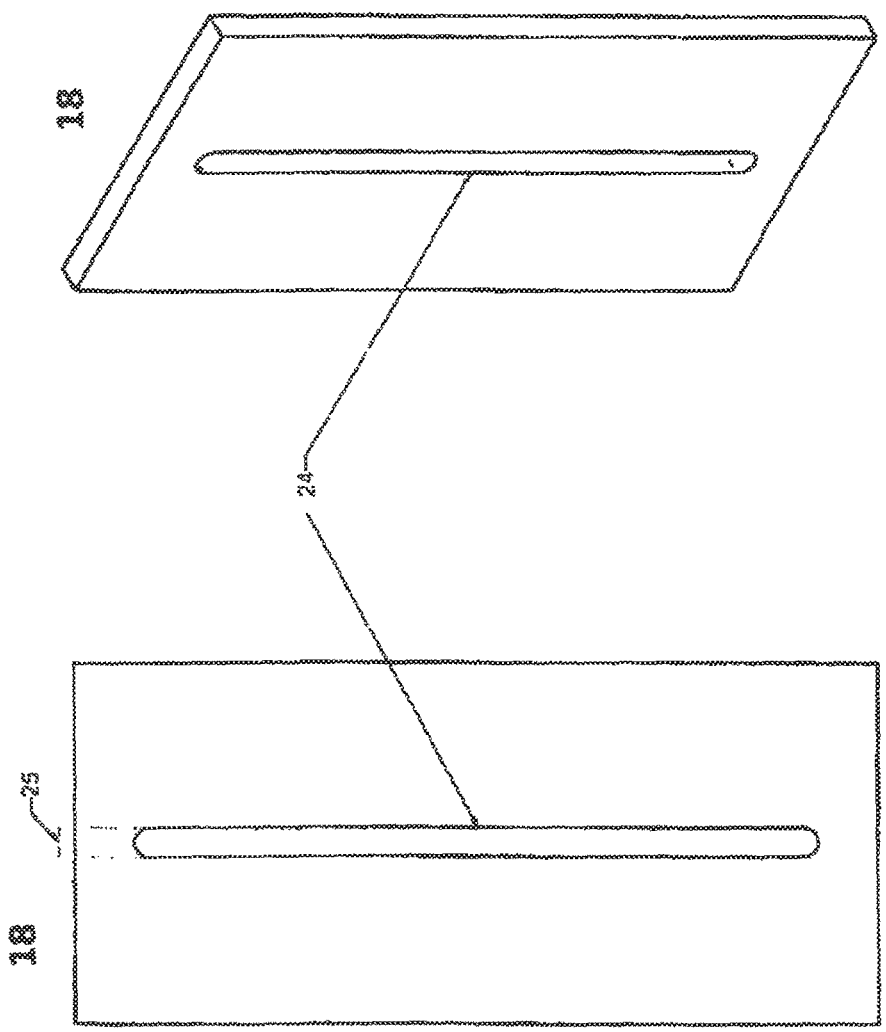
FIG. 5 is a front and orthogonal view of the side member back wall.

Referring to FIG. 5, side member back wall 18 has a slot 24 that is disposed vertically. Slot 18 has width 25.

Figure 6:
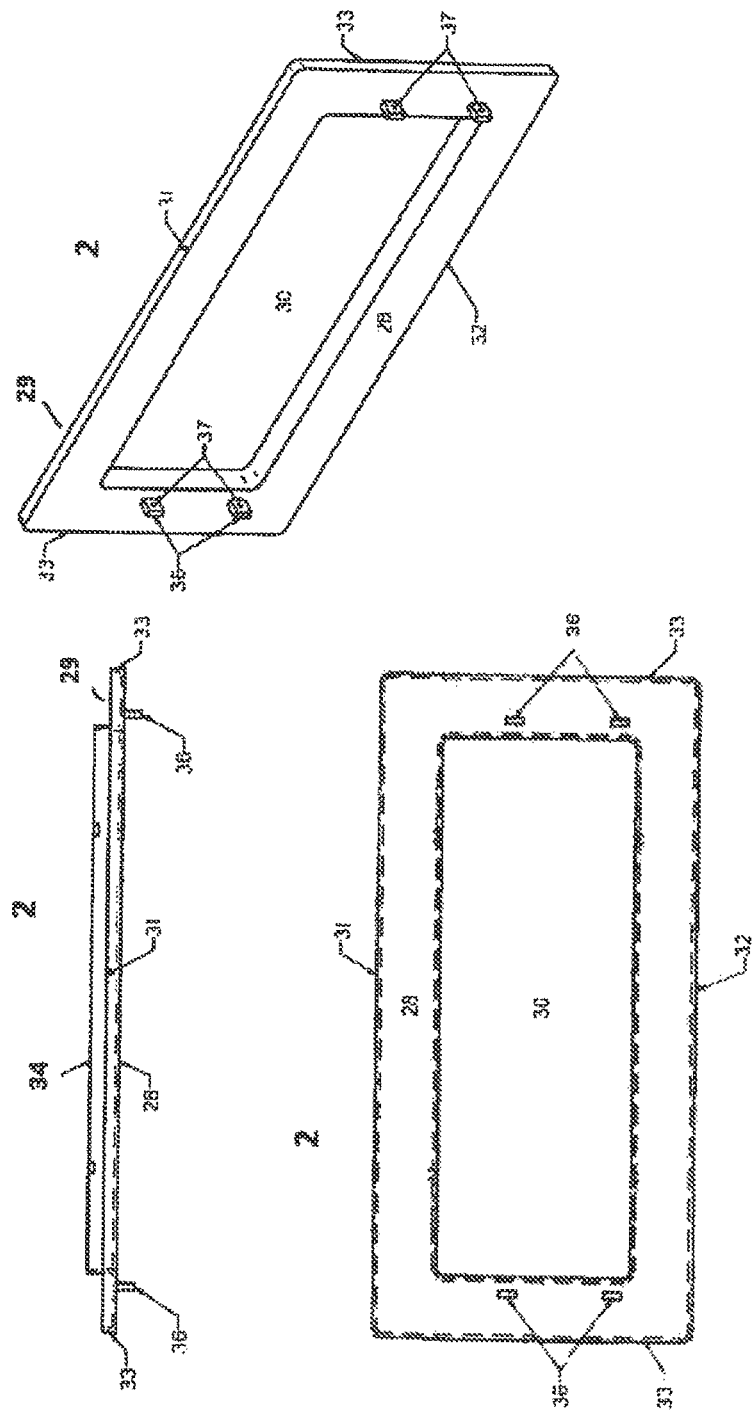
FIG. 6 is an illustration of multiple views of the back plate.

Referring to FIG. 6, back plate 2 has top edge 31, bottom edge 32, side edges 33, aperture 30, a front 28, and forwardly extending tabs 36. Forwardly extending tabs 36 include a hole 37 through which pin 38 (not shown) is inserted after the forwardly extending tab has been inserted through slot 24 (not shown). The backwardly extending ridge 34 of the back plate 2 fits into the pool aperture and removably fixes the back plate to the pool aperture.

Figure 7:
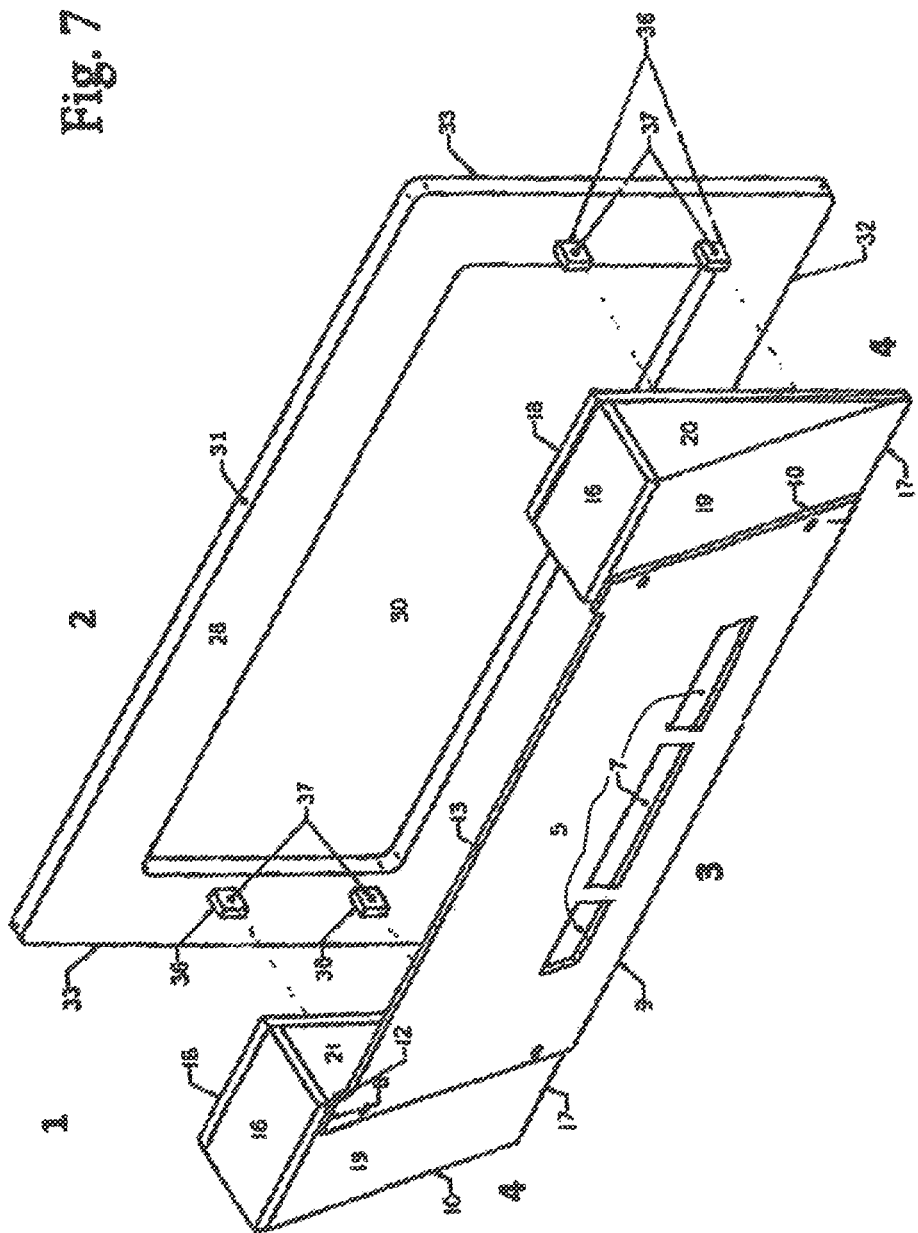
FIG. 7 is an orthogonal view of the front module and back plate.

Referring to FIG. 7, front module 1 is composed of two wedge-shaped side members 4 and face plate 3. Side members 4 are oriented with the wide section of the wedge corresponding to the side member top 16 at the top and the side member bottom edge 17 at the bottom. The side members 4 have a front wall 19, back wall 18, outer side wall 20 and inner side wall 21. Inner side walls 21 face each other. Face plate 3 has a front face 5, aperture 7, a top edge 8, side edges 10 and bottom edge 9. Weir 11 is formed by notching top edge 8 to produce angled side edges 12 and weir bottom 13. Face plate 3 is attached to side members 4 by an adhesive or a plurality of screws. Back plate 2 has top edge 31, bottom edge 32, side edges 33, aperture 30, a front 28, and forwardly extending tabs 36. Forwardly extending tabs 36 include a hole 37 through which pin 38 (not shown) is inserted after the forwardly extending tab has been inserted through slot 24 (not shown).

Figure 8:
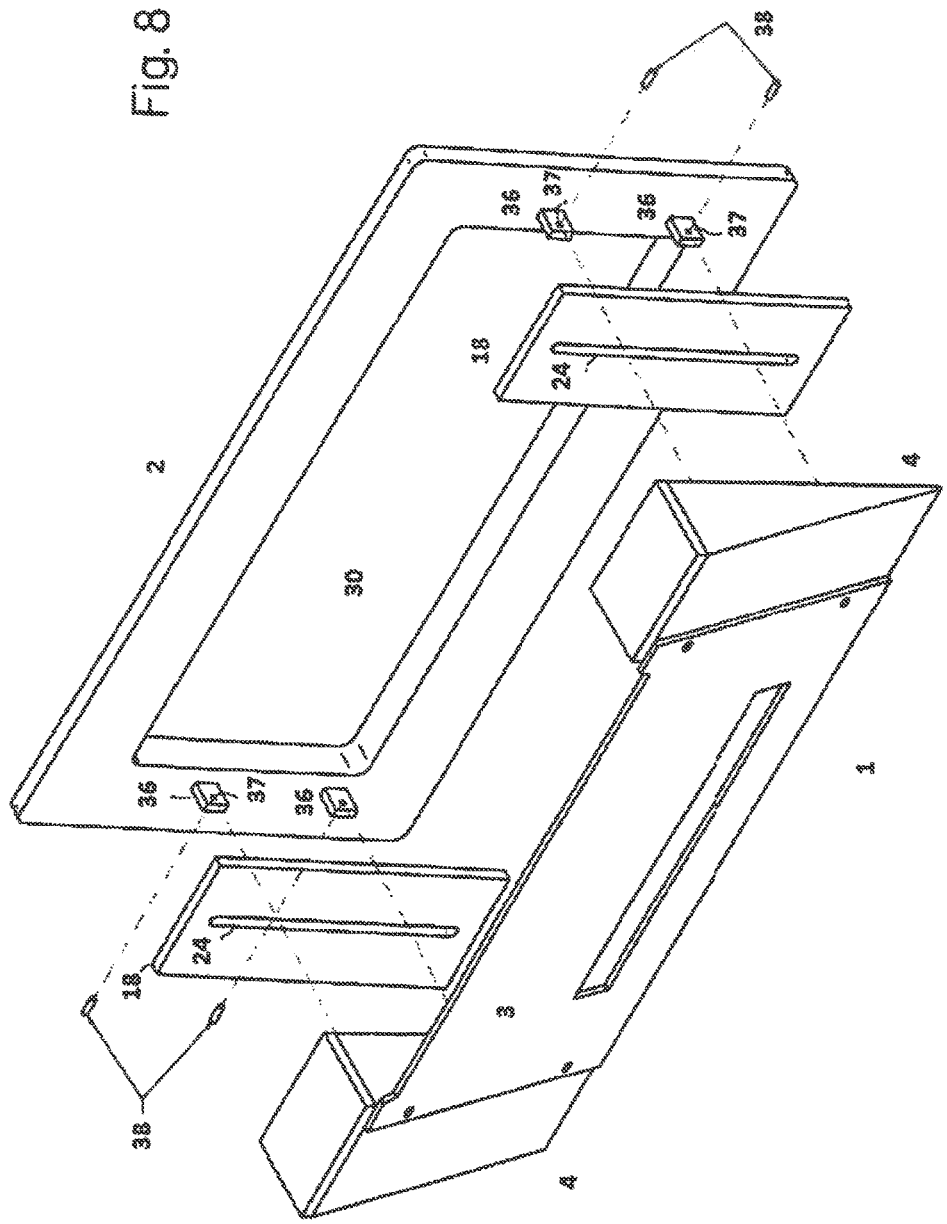
FIG. 8 is an assembly view of the front module and back plate.

Referring to FIG. 8, buoyant front module 1 containing face plate 3 and side members 4 is slideably attached to back plate 2. Back plate forwardly extending tabs 36 project through slot 24 of side member back wall 18. Pins 38 are inserted through holes 37 of the forwardly extending tabs 36.

Figure 9:
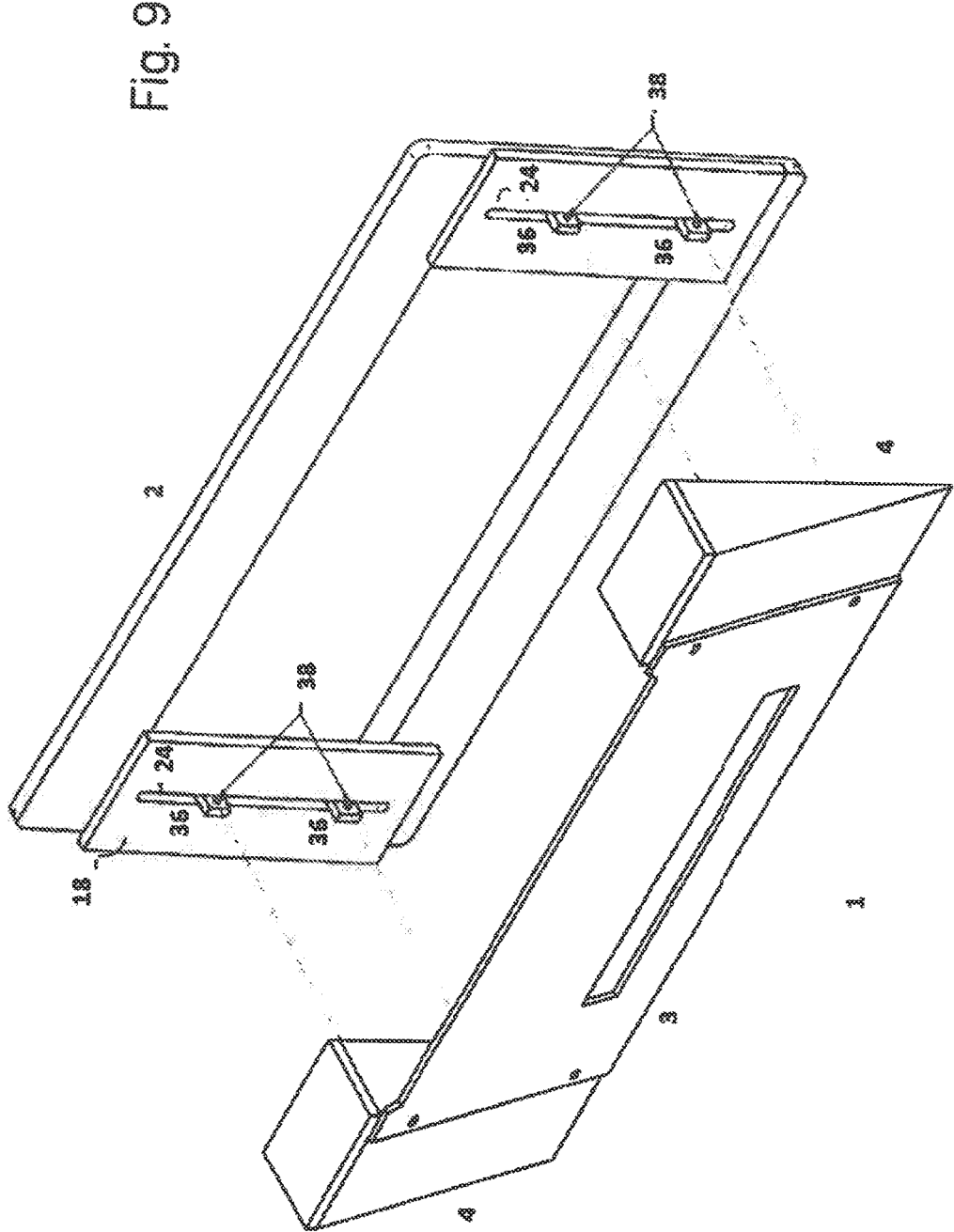
FIG. 9 is an orthogonal view of the front module connecting to the back plate.

Referring to FIG. 9, buoyant front module containing face plate 3 and side members 4 are attached to back plate 2 by pins 38 that are inserted through holes 37 provided in forwardly extending tabs 36 after insertion through slot 24 of side member back wall 18.

Figure 10:
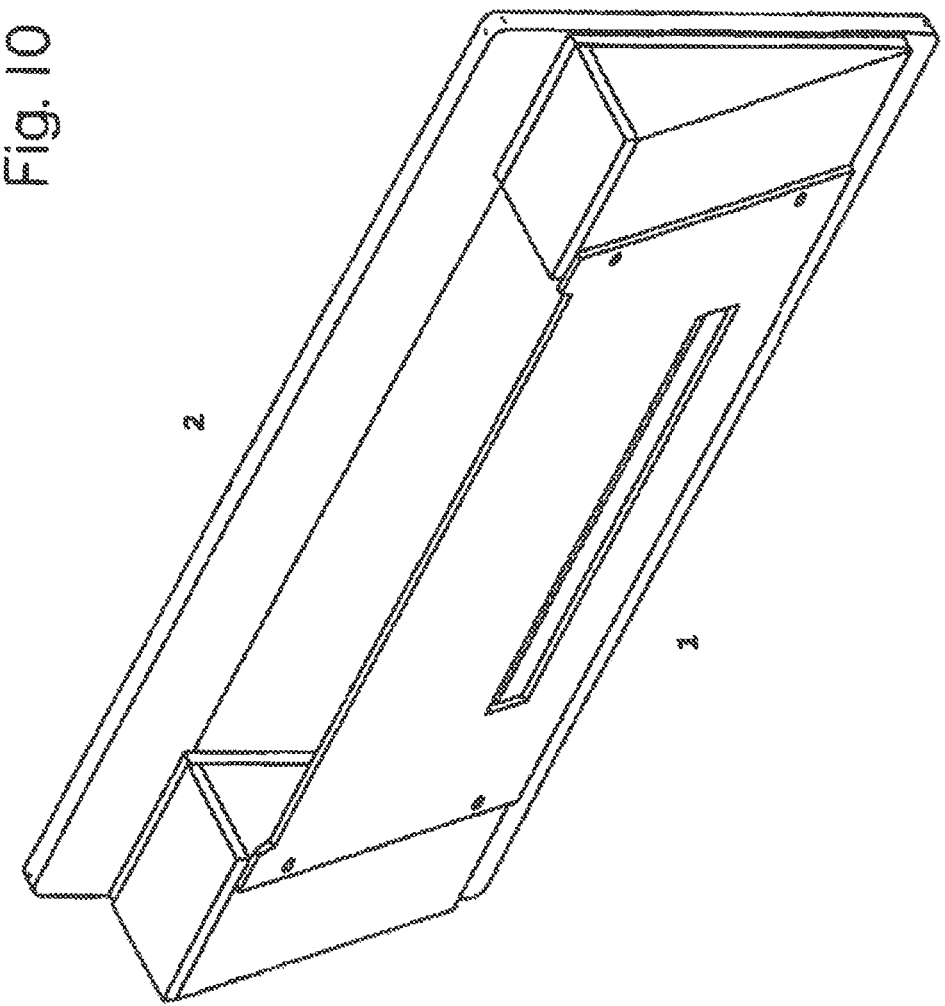
FIG. 10 is an orthogonal view of the assembled front module and back plate.

Referring to FIG. 10, buoyant front module 1 is attached to back plate 2.

Referring to FIG. 11, back plate 2 has top edge 31, bottom edge 32, side edges 33, aperture 30, a front 28, a back 29, forwardly extending tabs 36. Forwardly extending tabs 36 include a hole 37 through which pin 38 (not shown) is inserted after the forwardly extending tab has been inserted through slot 24 (not shown). The backwardly extending ridge 34 and fastening tabs 40 of the back plate 2 fit into the pool aperture and removably fix the back plate to the pool aperture.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A pool skimmer attachment comprising:
    a buoyant front module and a back plate,
        the front module comprising a face plate and two wedge-shaped side members,
            the face plate comprising a front, a back, an aperture to accommodate water flow, a top edge, a bottom edge and two side edges, the top edge being notched to form a weir comprising two angled side edges and a bottom edge, wherein the angled side edges are connected at one end to the top edge and at the other edge to the weir bottom edge,
        the wedge-shaped side members comprising a top, a bottom edge, a back wall, a front wall, an outer side wall, and an inner side wall, the side member front wall, two side walls, and back wall forming an interior channel disposed centrally along the side member's longitudinal axis, the back wall comprising a slot extending centrally along the longitudinal axis, wherein the slot has a width that is smaller than the width of the interior channel,
    wherein the face plate is attached to each wedge-shaped side member along a substantially vertical overlapping section of the face plate back proximate to the side edge and the front wall of the wedge-shaped side member proximate to the inner side wall, with the side member top being upwardly positioned, and
    wherein the back plate comprises a front, a back, an aperture to accommodate water flow, a top edge, a bottom edge and two side edges, and backwardly extending locking tabs for removably attaching the back plate to a pool skimmer opening,
        the front of the back plate comprising forwardly extending tabs that project through the side member back wall slots into the interior channel, wherein the forwardly extending tabs comprise a hole accommodating a pin positioned at an angle to the longitudinal axis of the slot, the pin having a length wider than the width of the slot, thereby slideably attaching the front module to the back plate, and permitting the free movement of the forwardly extending tabs within the slot, as the vertical position of the front module changes with the height of the water in the pool.

2. The pool skimmer attachment of claim 1 wherein the face plate aperture is a generally rectangular opening.

3. The pool skimmer attachment of claim 1, wherein the face plate aperture comprises a plurality of openings.

4. The pool skimmer attachment of claim 1 further comprising an adjustable flapper for regulating water flow through the face plate aperture.

5. The pool skimmer attachment of claim 1 wherein the angle formed by the wedge-shaped side member back wall and front wall at the bottom edge is from 5 to 40 degrees.

6. The pool skimmer attachment of claim 1 wherein the front module is constructed from a polyolefin having a density less than 1.0.

7. The pool skimmer attachment of claim 6 wherein the polyolefin is selected from polyethylene, polybutene or polypropylene.

8. The pool skimmer attachment of claim 7 wherein the polyethylene is low density polyethylene having a density of 0.910 to 0.940 g/cm$^3$.

9. A pool skimming system for removing debris from a pool water surface comprising a pool water skimmer; a stationary back plate removably connected to the pool water skimmer, the back plate comprising a front, a back, and an aperture; and a vertically mobile, buoyant front module comprising a rear slot disposed vertically, an aperture and a weir, the front module being slideably connected to the front of the back plate by connecting means at the vertical rear slot, wherein the front module moves up and down with the level of water in the pool to maintain a substantially constant position of the weir relative to the pool water surface.

10. A process for extending the effective performance of a pool skimmer to higher pool levels, the process comprising:

providing a pool skimming system in a pool having a level of water, the skimming system comprising a pool water skimmer and a pool skimmer attachment, the pool water skimmer comprising an aperture in the pool wall for receiving pool water, wherein a conduit extends from the aperture to a water pump having an inlet and a discharge end, a conduit extends from the pump discharge to a filter having an inlet and an outlet; and a conduit extends from the filter outlet to water inlet ports in the pool wall;

the pool skimmer attachment comprising a stationary back plate removably connected to the pool water skimmer aperture, the back plate comprising a front, a back, and an aperture; and a vertically mobile, buoyant front module comprising a rear slot disposed vertically, an aperture and a weir, the front module being slideably connected to the front of the back plate by connecting means at the vertical rear slot, wherein the front module moves up and down with the level of water in the pool to maintain a substantially constant position of the weir relative to the pool water surface, circulating water from the pool over the front module weir through the aperture in the back plate into the pool skimmer aperture;

circulating water from the pool skimmer aperture through a filter system and back to the pool; and increasing the level of water in the pool, wherein the front module rises with the increasing level of water in the pool, thereby maintaining a constant level in the surface of the pool with respect to the weir.

11. A process comprising filtering water in a pool with the pool skimmer attachment of claim 1.

* * * * *